United States Patent Office 2,823,290
Patented Feb. 11, 1958

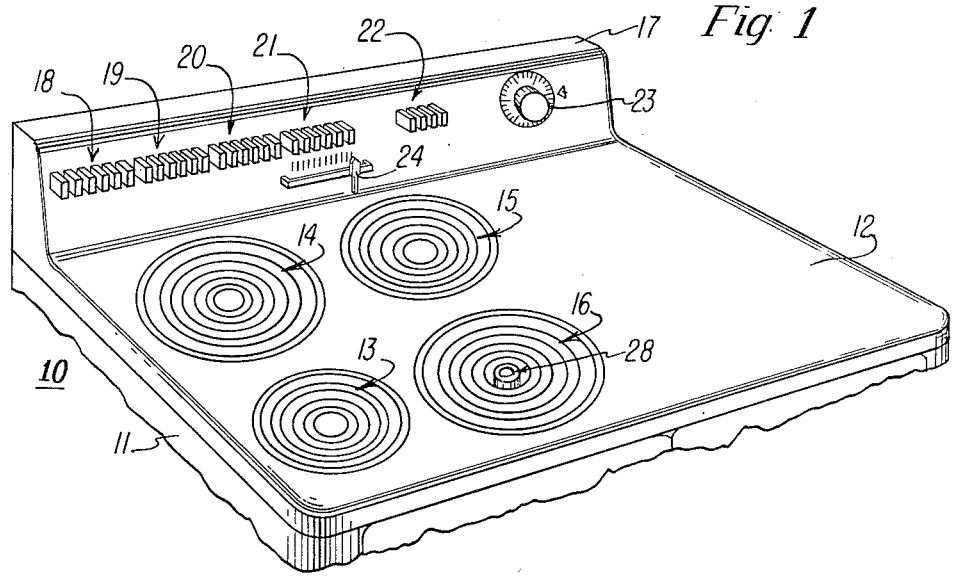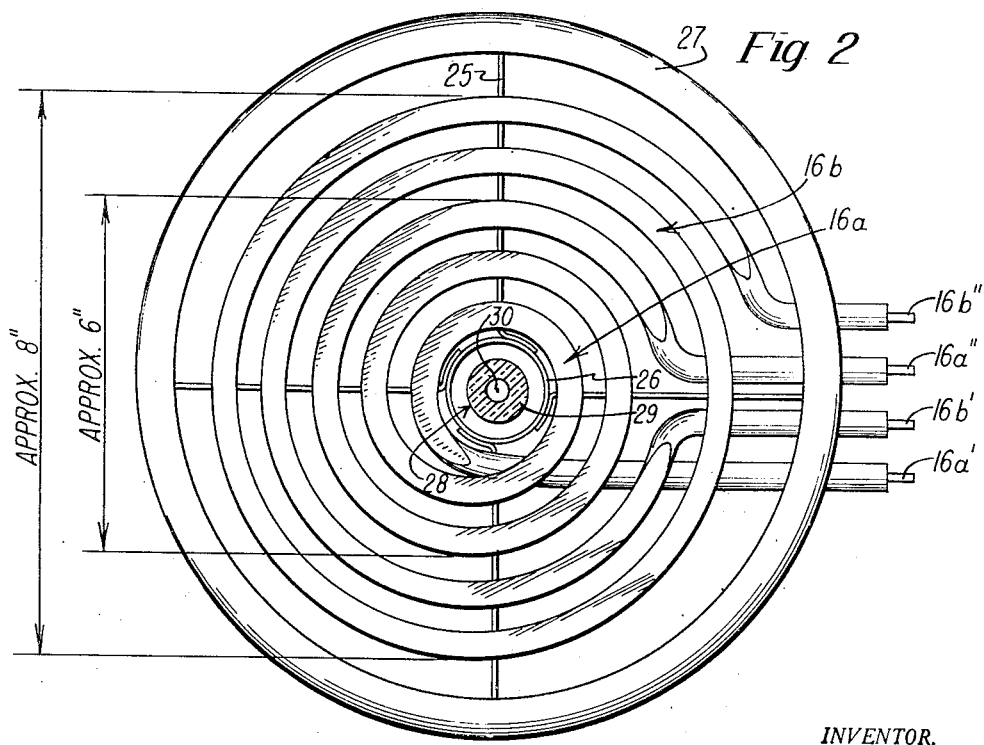

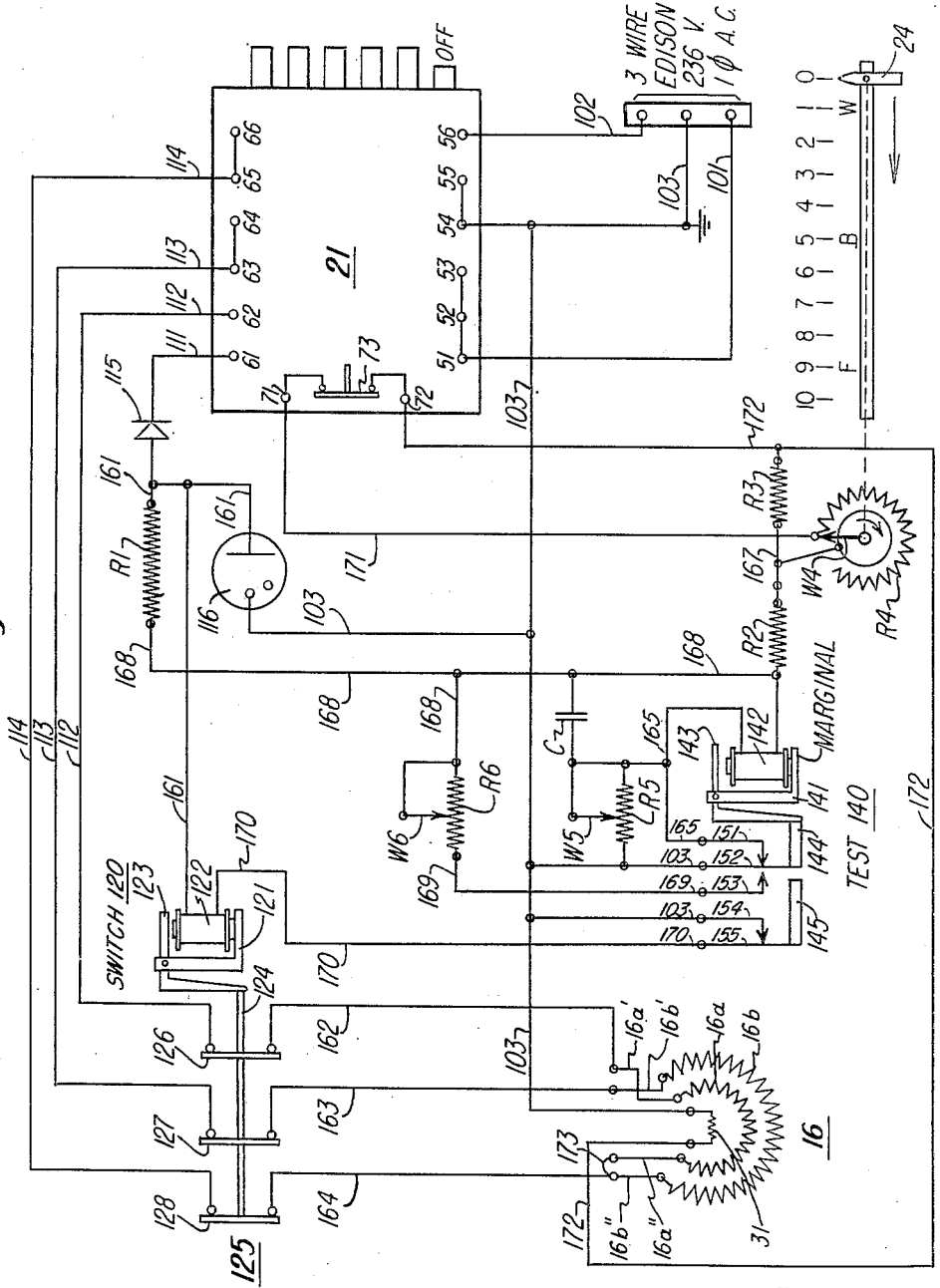

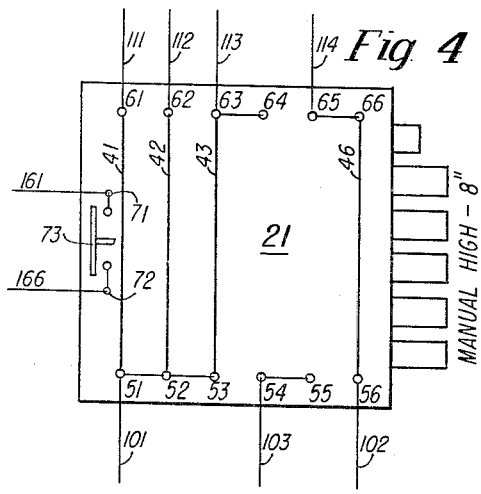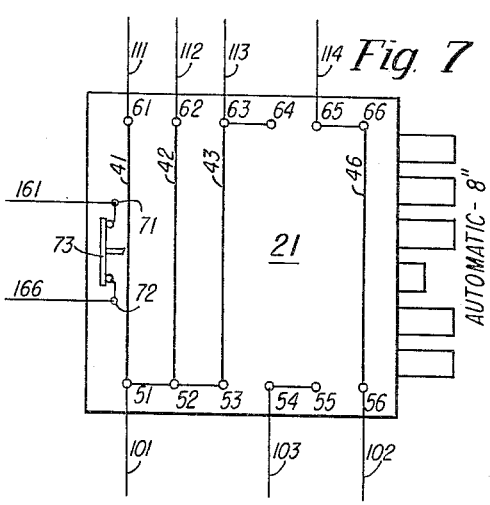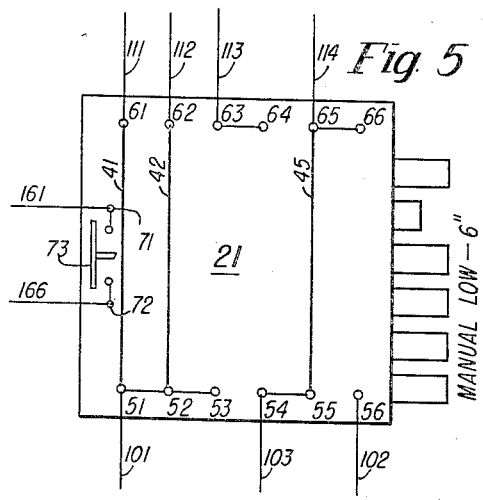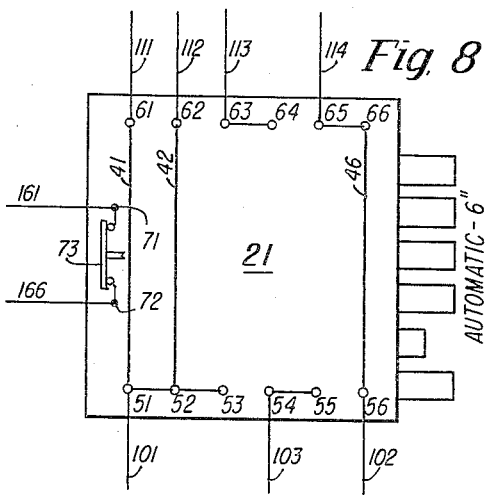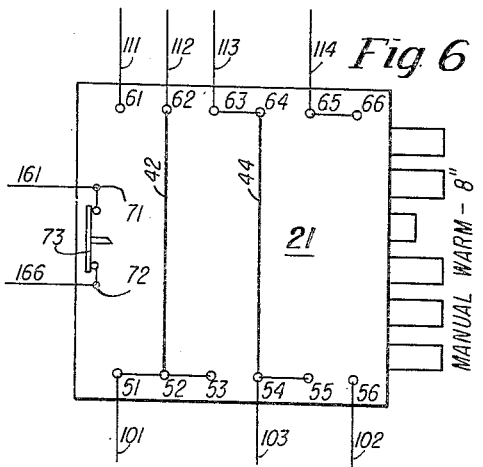

2,823,290

ELECTRIC HEATING APPARATUS

Roland O. Warner, Evergreen Park, Ill., assignor to General Electric Company, a corporation of New York Application October 14, 1955, Serial No. 540,411

12 Claims. (Cl. 219—20)

The present invention relates to electric heating apparatus, and more particularly to improved switching and automatic temperature control systems for electric heating units or hot plates.

It is the general object of the present invention to provide in electric heating apparatus comprising an electric hotplate including substantially coplanar inner and outer heating sections, wherein the outer heating section is arranged in surrounding relation with the inner heating section, an improved switching and automatic temperature control system so that in the hotplate selective heating of either both of the heating sections or only the inner heating section may be effected on a basis of automatic temperature control.

Another object of the invention is to provide in electric heating apparatus of the character described, an improved switching system so that in the hotplate selective heating of either both of the heating sections or only the inner heating section may be effected on a basis of continuous heating at fixed heating rates.

A further object of the invention is to provide electric heating apparatus of the character described, wherein both the desired effective size of the hotplate and the desired basis of control of the heating thereof may be preset by selective operation of a single unitary manually operable control switch.

A still further object of the invention is to provide electric heating apparatus of the character described, wherein the control switch mentioned is of the pushbutton type provided with a plurality of individual pushbuttons respectively corresponding to the different combinations of desired heating effects in the hotplate.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a fragmentary front perspective view of the upper portion of an electric range incorporating electric heating apparatus embodying the present invention;

Fig. 2 is a greatly enlarged plan view of one of the electric heating units or hotplates incorporated in the electric range, and illustrating the general arrangement of the inner and outer heating sections thereof, as well as the temperature sensing unit incorporated therein and forming a part of the electric control network;

Fig. 3 is a diagram of the electric control circuit for the electric heating unit or hotplate and incorporating the temperature sensing unit, both shown in Fig. 2, as well as a manually operable control switch of the pushbutton type, the pushbutton switch being diagrammatically illustrated in its off position; and Figs. 4 to 8, inclusive, are diagrammatic illustrations of the pushbutton switch shown in Fig. 3, when it occupies its respective manual high-8", manual low-6", manual warm-8", automatic-8" and automatic-6" positions.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relation in a substantially rectangular pattern on the left-hand side thereof. The body 11 houses an oven, not shown, in the right-hand portion thereof, and a compartment, not shown, in the left-hand portion thereof, the oven and the compartment being provided with respective front doors, not shown. The cooking top 12 carries an upstanding backsplash 17 adjacent to the rear thereof that, in turn, carries a plurality of surface heating unit selector switches 18, 19 and 20, a special surface heating unit selector or control switch 21, an oven selector switch 22, and an oven regulator or thermostatic switch 23, the elements 18 to 23, inclusive, being arranged in a row across the top of the backsplash 17. The selector switches 18, 19 and 20 respectively correspond to the surface heating units 13, 14 and 15 of conventional construction and are respectively included in the electric heating circuits thereof, while the special control switch 21 corresponds to the surface heating unit 16 of special construction and is included in the electric heating circuit thereof. Each of the surface heating unit selector switches 18, 19 and 20 is of the pushbutton type and is preferably of the construction of that disclosed in U. S. Patent No. 2,431,904, granted on December 2, 1947, to John L. Andrews; while the special control switch 21 is of the pushbutton type and of a modified form with respect to the construction disclosed in the Andrews patent mentioned, as explained more fully hereinafter.

Also the backsplash 17 carries a manually operable temperature setting device 24 that is arranged in operative relation with the special control switch 21 and positioned directly therebelow. Specifically, the device 24 essentially comprises a combination handle and pointer that is mounted for longitudinal sliding movement in an elongated slot provided in the front wall of the backsplash 17 immediately below the special control switch 21 and cooperating with associated indicia carried by the adjacent front wall mentioned. As explained more fully hereinafter in conjunction with Fig. 3, the handle of the temperature setting device 24 is slidably longitudinal in the slot mentioned to bring about the setting of a desired temperature in a given temperature range that is to be maintained by the surface heating unit 16.

The cooking top 12 has a plurality of openings therein that respectively receive the surface heating units 13, etc.; and each of the surface heating units 13, 14 and 15 may be fundamentally of the construction disclosed in U. S. Patent No. 2,565,443, granted on August 21, 1951, to Oliver G. Vogel and Francis E. Kirk; while the surface heating unit 16 is of special construction described more fully below.

The surface heating unit 16 is of the hotplate type, and is mounted for pivotal movement in the associated opening provided in the cooking top 12, by mechanism, not shown, that is preferably of the construction of that disclosed in U. S. Patent No. 2,565,432, granted on August 21, 1951, to Francis E. Kirk. More particularly, referring to Fig. 2, the heating unit 16 comprises a spider 25 provided with a substantially centrally disposed upstanding inner ring 26 and a surrounding outer trim ring 27. Specifically, the spider 25 includes four radially directed arms disposed in substantially equal angular spaced-apart relation and carrying a composite heating element including inner and outer heating sections respectively designated 16a and 16b. The inner heating section 16a is of substantially spiral form and disposed adjacent to the central ring 26; while the outer heating section 16b is also of substantially spiral form and disposed in surrounding relation with the inner heating section 16a and adjacent to the outer trim ring 27; and the heating sections 16a and 16b are disposed substantially coplanar and in a substantially horizontal plane; whereby they extend radially generally between the inner ring 26 and the outer ring 27. As indicated in Fig. 2, the overall diameter of the inner heating section 16a may be approximately 6″ and the overall diameter of the outer heating section 16b may be approximately 8″. The inner heating section 16a is provided with a pair of terminals 16a' and 16a″ extending radially outwardly and below the trim ring 27; the outer heating section 16b is provided with a pair of terminals 16b' and 16b″ extending radially outwardly and below the trim ring 27; and the terminals 16a', 16a″, 16b' and 16b″ are provided with an insulating terminal block, not shown, that is employed for the purpose of making the exterior electrical connections extending to the elements of the control circuit of Fig. 3, as explained more fully hereinafter. Preferably, the heating sections 16a and 16b are of the metal sheath electrical resistance conductor type disclosed in U. S. Patent No. 1,367,341, granted on February 1, 1921, to Charles C. Abbott; and the convolutions of the heating sections 16a and 16b are selectively staked to the arms of the spider 25 in the general manner disclosed in the Vogel and Kirk patent mentioned. The top surfaces of the coils of the heating sections 16a and 16b are flattened to define a substantially horizontal plane adapted to engage and to support the bottom wall of a cooking vessel, or the like, not shown. In the arrangement, the inner heating section 16a is adapted to support alone the bottom wall of a relatively small heating vessel; while the inner heating section 16a and the outer heating section 16b are adapted to support mutually the bottom wall of a relatively large heating vessel.

The hotplate 16 carries a temperature sensing unit 28 within the central ring 26 that is adapted to engage the bottom wall of a cooking vessel, or the like, supported thereupon; which unit 27 is preferably of the general construction and arrangement of that disclosed in the copending application of Robert J. Molyneaux and Kenneth H. Walkoe, Serial No. 397,874, filed December 14, 1953, now Patent No. 2,727,975, granted December 20, 1955. Specifically, the unit 28 comprises a ceramic insulating cap 29 mounted for vertical movement within the inner ring 26 and carrying a centrally disposed metal button 30 formed of aluminum and adapted directly to engage the bottom wall of the supported cooking vessel in good heat-exchange relation therewith. Arranged within the metal button 30 is a temperature sensing element 31 (indicated in Fig. 3) that is in the form of a "thermistor" material having a high negative temperature coefficient of resistance. This material consists essentially of sintered aluminum oxide and an oxide of magnesium, manganese, titanium, iron, nickel, cobalt, zinc, etc. For example, the thermistor 31 may have the exceedingly high negative temperature coefficient of resistance of: —0.044 ohm/ohm/° C.; whereby the characteristic of the thermistor 31 may be as follows:

| Temperature (° C.): | Total resistance (ohms) |
|---|---|
| 25 | 100,000 |
| 50 | 34,000 |
| 100 | 6,000 |
| 150 | 1,700 |
| 200 | 580 |

As previously noted, the special control switch 21 is of the pushbutton type and comprises, as indicated in Fig. 1, a casing housed within the hollow backsplash 17 and provided with six individual pushbuttons projecting forwardly through cooperating openings provided in the front wall of the backsplash 17. As indicated in Figs. 3 to 8, inclusive, the six individual pushbuttons mentioned are respectively designated: off, manual high-8″, manual low-6″, manual warm-8″, automatic-8″ and automatic-6″. More particularly, the casing of the pushbutton switch 21 houses six individual switch blades 41 to 46, inclusive, six individual incoming terminals 51 to 56, inclusive, six individual outgoing terminals 61 to 66, inclusive, and mechanism selectively governed by the six individual pushbuttons for selectively operating the six individual switch blades 41 to 46, inclusive. More particularly, when the off pushbutton occupies its operated position, as shown in Fig. 3, the six incoming terminals 51 to 56, inclusive, are respectively disconnected with respect to the six outgoing terminals 61 to 66, inclusive; when the manual high-8″ pushbutton occupies its operated position, as shown in Fig. 4, the four incoming terminals 51, 52, 53 and 56 are respectively connected by the four switch blades 41, 42, 43 and 46 to the four outgoing terminals 61, 62, 63 and 66; when the manual low-6″ pushbutton occupies its operated position, as shown in Fig. 5, the three incoming terminals 51, 52 and 55 are respectively connected by the three switch blades 41, 42 and 45 to the three outgoing terminals 61, 62 and 65; when the manual warm-8″ pushbutton occupies its operated position, as shown in Fig. 6, the two incoming terminals 52 and 54 are respectively connected by the two switch blades 42 and 44 to the two outgoing terminals 62 and 64; when the automatic-8″ pushbutton occupies its operated position, as shown in Fig. 7, the four incoming terminals 51, 52, 53 and 56 are respectively connected by the four switch blades 41, 42, 43 and 46 to the four outgoing terminals 61, 62, 63 and 66; and when the automatic-6″ pushbutton occupies its operated position, as shown in Fig. 8, the three incoming terminals 51, 52 and 56 are respectively connected by the three switch blades 41, 42 and 46 to the three outgoing terminals 61, 62 and 66.

Also, within the casing of the pushbutton switch 21 there is arranged a side switch 73, that normally occupies its closed position, but that is operated into its open position when either the manual high-8″ pushbutton or the manual low-6″ pushbutton is operated, as respectively shown in Figs. 4 and 5. Further, within the casing of the pushbutton switch 21 the three incoming terminals 51, 52 and 53 are permanently strapped together; the incoming terminals 54 and 55 are permanently strapped together; the outgoing terminals 63 and 64 are permanently strapped together; and the outgoing terminals 65 and 66 are permanently strapped together. Further, the pushbutton switch 21 comprises interlock mechanism, not shown, of the character of that disclosed in the previous-mentioned Andrews patent, so that the operation of any one of the pushbuttons into its depressed position effects the turn of the last-operated one of the pushbuttons into its projected position; whereby only one of the six individual pushbuttons may occupy its depressed or operated position at any time.

The circuit network comprises, as shown in Fig. 3, certain elements that are connected and arranged in the general manner of those disclosed in the copending application of Donald R. Conkling, Ser. No. 450,361, filed August 17, 1954, now Patent 2,764,662, and including a three-wire Edison source of power supply of 236-volts, single-phase, 60-cycles, A. C., provided with two outside lines 101 and 102 and a grounded neutral line 103, the outside lines 101 and 102 being respectively connected to the incoming terminals 51 and 56 of the pushbutton switch 21, and the neutral line 103 being connected to the incoming terminal 54 thereof. The outgoing terminals 61, 62, 63 and 65 of the pushbutton switch 21 are respectively connected to four supply conductors 111, 112, 113 and 114. The side switch 73 is connected across two terminals 71 and 72 that respectively terminate two conductors 171 and 172.

In the temperature setting device 24, the manually operable knob thereof is operatively connected to a rotatably mounted wiper W4 that is operatively associated with an adjustable control resistor R4; and the pointer of this knob cooperates with indicia carried by the front wall of the backsplash 17, as indicated in Fig. 1, and as shown in Fig. 3; which indicia comprises the numerals 0–10, and indicating the general temperature range embracing warm, boil and fry temperatures, the letters "W," "B" and "F" being respectively associated with the numerals "1," "5" and "9." In the arrangement, the positions of the manual knob mentioned in its range correspond to temperatures of a cooking vessel supported by the hotplate 16; whereby the warm range may correspond to the temperature band 120–220° F., the boil range may correspond to the temperature band 220–320° F.; and the fry range may correspond to the temperature band 320–420° F. Accordingly, the warm, boil and fry bands respectively correspond to meat-cooking, candy-making and deep-fat-frying cooking operations. Specifically, when the manual knob of the device 24 occupies its extreme right-hand or "0" position, the wiper W4 is rotated to exclude entirely the associated control resistor R4 from the associated circuit; and when the manual knob of the device 24 occupies its extreme left-hand or "10" position, the wiper W4 is rotated to include entirely the associated control resistor R4 in the associated circuit. The inside terminal of the control resistor R4 is connected to a conductor 171, while the wiper W4 is connected to a conductor 167.

Also the circuit network comprises a dry plate rectifier 115, preferably of the selenium type, an associated load resistor R1, a current-limiting resistor R2, a fixed control resistor R3, two auxiliary control resistors R5 and R6, a gaseous discharge tube 116 of the glow discharge type, a capacitor C, a switch relay 120 and a test relay 140. In the arrangement, the auxiliary control resistors R5 and R6 are respectively provided with associated wipers W5 and W6 for the purpose of selectively adjusting the effective resistance thereof. The switch relay 120 is provided with a field structure 121 carrying an operating winding 122 and provided with a pivotally mounted armature 123 that cooperates with an insulating operating member 124 of a power switch 125 carrying three contact bridging members 126, 127 and 128 respectively controlling three pairs of contacts. Similarly, the test relay 140 is provided with a field structure 141 carrying an operating winding 142 and provided with a pivotally mounted armature 143 that cooperates with two insulating operating members 144 and 145. The operating member 144 is carried by a switch spring 152 that cooperates with two additional switch springs 151 and 153; and the operating member 145 is carried by a switch spring 155 that cooperates with an additional switch spring 154. The test relay 140 is of the marginal type so that the armature 143 is moved to its restored position illustrated, when the operating winding 142 is energized with less than a critical current, as explained more fully hereinafter.

In the circuit network, the rectifier 115 is connected between the supply conductor 111 and a conductor 161; the load resistor R1 is connected between the conductor 161 and a conductor 168; the current limiting resistor R2 is connected between the conductor 168 and the conductor 167; the fixed control resistor R3 is connected between the conductor 167 and the conductor 172; the side switch 73, when closed, connects together the conductors 171 and 172; and the thermistor 31 is connected between the conductor 172 and the neutral line 103. Thus, the variable control resistor R4 and the fixed control resistor R3 are normally connected in parallel relation. The cathode of the gaseous diode 116 is connected to the conductor 161 and the anode thereof is connected to the neutral line 103. The operating winding 122 is connected between the conductor 161 and a conductor 170; the operating winding 142 is connected between the conductor 168 and a conductor 165; the capacitor C is bridged across the conductors 165 and 168; the auxiliary control resistor R5 is connected between the conductor 165 and the neutral line 103; and the auxiliary control resistor R6 is connected between the conductor 168 and a conductor 169. The switch springs 151, 152, 153, 154 and 155 respectively terminate the conductor 165, the neutral line 103, the conductor 169, the neutral line 103, and the conductor 170. The contacts associated with the bridging member 126 respectively terminate the supply conductor 112 and a feed conductor 162; the contacts associated with the bridging member 127 respectively terminate the supply conductor 113 and a feed conductor 163; and the contacts associated with the bridging member 128 respectively terminate the supply conductor 114 and a feed conductor 164. The exterior terminal 16a' of the inner heating section 16a is connected to the feed conductor 162; the exterior terminal 16b' of the outer heating section 16b is connected to the feed conductor 163; and the interior terminals 16a'' and 16b'' of the respective inner and outer heating sections 16a and 16b are commonly connected together by a strap 173 and connected to the feed conductor 164.

When the circuit network occupies its normally restored position illustrated in Fig. 3, with the pushbutton switch 21 in its off position, the diode 116 is extinguished, the switch relay 120 and the test relay 140 occupy their restored positions; and the hotplate 16 is deenergized. At this time: the switch spring 152 engages the associated switch spring 151 and disengages the associated switch spring 153; and the switch spring 155 engages the associated switch spring 154; the side switch 73 is closed; and the power switch 125 occupies its closed position so that the bridging members 126, 127 and 128 respectively connect the supply conductors 112, 113 and 114 to the feed conductors 162, 163 and 164.

In the circuit network, the characteristic values of certain of the elements may be as follows:

| | | |
|---|---|---|
| R1 | ohms | 1,800 |
| R2 | do | 40,000 |
| R3 | do | 10,000 |
| R4 | do | 0–10,000 |
| R5 | do | 0–10,000 |
| R6 | do | 0–4,800 |
| C | microfarads | 25 |

The pickup current of the winding 142 of the test relay 146 may be about 10 milliamperes D. C.; and the dropout current thereof may be about 6 milliamperes D. C.; and the selenium rectifier 115 may be rated at 117-volts A. C., 60-cycles, 30-milliamperes D. C.

Considering now the operation of the circuit network, when the pushbutton switch 21 occupies its normal off position, as illustrated in Fig. 3, the lines 101, 102 and 103 are disconnected from all of the supply conductors 111, 112, 113 and 114, deenergizing all of the elements of the circuit network so that the relays 120 and 140 normally occupy their restored positions so that the elements of the control circuit are deenergized and the heating sections 16a and 16b of the hotplate 16 are deenergized.

Now assuming that the cook wishes to carry out an automatic temperature controlled cooking operation employing the full size of the hotplate 16, she first sets the manual knob of the device 24 into the desired temperature range, and then operates the automatic-8" pushbutton of the pushbutton switch 21 into its position, as shown in Fig. 7; whereby the outside line 101 is commonly connected to the supply conductors 111, 112 and 113 and the outside line 102 is connected to the supply conductor 114. At this time, it may be assumed that the manual knob of the device 24 occupies its extreme right-hand position at the bottom of the warm band of its temperature control range, as illustrated in Fig. 3; whereby the wiper W4 is rotated completely to exclude the associated control resistor R4 from the connection between the conductors 167 and 171; whereby the fixed control resistor R3 is short-circuited, with the side switch 73 in its closed position, via the path including the conductors 167, 171 and 172, the wiper W4 and the side switch 73. Also, it may be assumed that the hotplate 16 is cool, and that the cook places the cooking vessel and its contents in a supported position upon the top surface of the inner and outer sections 16a and 16b thereof so that the bottom wall of the cooking vessel engages the sensing button 30 moving the sensing unit 28 into its depressed position in order that the sensing button 30 is in good thermal contact with the bottom wall of the cooking vessel perfecting the cooperation with the temperature sensing element or thermistor 31. At this time, the thermistor 31 is cool so that it has the extremely high resistance previously noted; and when the outside line 101 is connected to the supply conductor 111, there is completed a circuit for operating the rectifier 115 and for effecting operation of the glow discharge tube 116. The circuit extends from the supply conductor 111 via the rectifier 115 to the control bus 161, and from the control bus via the glow discharge tube 116 to the neutral line 103; whereby the glow discharge tube 116 operates to regulate the half-wave rectified voltage appearing upon the control bus 161. Also, at this time, a path may be traced from the control bus 161 via the load resistor R1 to the feed conductor 168; a first circuit for energizing the winding 142 of the test relay 140 may be traced from the feed conductor 168 via the conductor 165 and the contacts between the switch springs 151 and 152 to the neutral line 103; and a series bridge circuit may be traced from the feed conductor 168 via the current limiting resistor R2, the conductor 167, the wiper W4, the terminal of the control resistor R4, the conductor 171, the side switch 73 in its closed position, the conductor 172, and the thermistor 31 to the neutral line 103. Further, the application of direct potential upon the control bus 161 momentarily completes a circuit for energizing the winding 122 of the switch relay 120; however, without effect at this time, since this circuit is immediately interrupted by operation of the test relay 140, as explained below. Accordingly, at this time, the winding 142 of the test relay 140 is energized causing the relay to operate so that its armature 143 is actuated. More particularly, the armature 143 operates first the actuator 144 and then the actuator 145. Specifically, the switch spring 152 is moved to disengage the stationary switch spring 151 opening a normally closed short-circuit between the neutral line 103 and the conductor 165 around the auxiliary control resistor R5; whereby the auxiliary control resistor R5 is inserted in series relation with the winding 142 between the feed conductor 168 and the neutral line 103, for a purpose more fully explained hereinafter. Also, the movable switch spring 152 engages the stationary switch spring 153 completing a circuit for connecting the auxiliary control resistor R6 between the feed conductor 168 and the neutral line 103, for a purpose more fully explained hereinafter. Further, the movable switch spring 155 disengages the stationary switch spring 154 interrupting the previously-mentioned circuit for energizing the winding 122 of the switch relay 120 so as to retain the switch relay 120 in its restored position, with the result that the power switch 125 is retained in its closed position at this time. Accordingly, the supply conductors 112, 113 and 114 are respectively connected to the feed conductors 162, 163 and 164, with the result that the inner and outer sections 16a and 16b of the hotplate 16 are energized in parallel relation across the 236-volts of the Edison supply effecting heating of the hotplate 16 at the high rate and the consequent heating of the supported cooking vessel and the resulting heating of the thermistor 31 arranged in good heat-exchange relation with the bottom wall of the supported cooking vessel.

At this time, when the thermistor 31 is cool, the above-traced series bridge circuit, including the current-limiting resistor R2, and the thermistor 31 has an exceedingly high composite resistance due to the exceedingly high resistance of the thermistor 31, as previously explained; whereby an exceedingly small direct current traverses this series bridge circuit resulting in the passage of an exceedingly small load current through the load resistor R1. As a result of this exceedingly small load current traversing the load resistor R1, the direct voltage upon the feed conductor 168 is quite high. In passing, it is noted that the capacitor C bridged across the winding 142 of the test relay 140 also serves as a filter capacitor minimizing the A. C. ripple upon the D. C. voltage appearing between the feed conductor 168 and the grounded neutral line 103.

Initially the winding 142 of the test relay 140 is energized directly between the feed conductor 168 and the neutral line 103, thereby insuring a quick pickup or operation thereof; however, incident to operation of the test relay 140, the auxiliary control resistor R4 was inserted in series relation with the energizing circuit for the winding 142 thereof so as to facilitate subsequently the restoration of the test relay 140 upon the event of a reduction in the direct voltage applied to the feed conductor 168. Moreover, incident to operation of the test relay 140, the auxiliary control resistor R5 was bridged between the feed conductor 168 and the neutral line 103 in order to compensate the network for the effective change in the resistance of the circuit for energizing the winding 142 of the test relay 140 as a consequence of the operation of this relay from its restored position into its operated position. This compensation of the circuit network insures that the change of position of the test relay 140 from its restored position into its operated position imposes no different ultimate load upon the feed conductor 168 and consequently upon the load resistor R1; whereby the load current traversing the load resistor R1 is substantially the same when the test relay 140 occupies either its restored position or its operated position. In order to insure this result, the equivalent resistance between the feed conductor 168 and the neutral line 103 should be the same when the test relay 140 occupies its respective restored and operated position; whereby:

$$R \text{ (equiv)} = R_{142} = \frac{(R_{142} + R_5) R_6}{R_{142} + R_5 + R_6}$$

wherein:

$R_{142}$ = resistance of the winding 142
$R_5$ = resistance of the resistor R5
$R_6$ = resistance of the resistor R6

As the temperature of the hotplate 16 rises, with the passage of time, the temperature of the cooking vessel and its contents rise; whereby the sensing button 30 is heated through the bottom wall of the cooking vessel to raise the temperature thereof so as to bring about an increase in the temperature of the thermistor 31; whereby the resistance of the thermistor 31 is decreased effecting a corresponding decrease in the composite resistance of the series bridge circuit, also including the current limiting resistor R2 and any portion of the included parallel connected control-resistors R3 and R4 (none in the present example). As the composite resistance of this series bridge circuit is thus decreased, the current traversing the same is correspondingly increased so that the current traversing the load resistor R1 is correspondingly increased bringing about an increase in the voltage drop across the load resistor R1 and consequently a decrease in the voltage appearing upon the feed conductor 168 with respect to the neutral line 103. As the voltage thus applied to the feed conductor 168 is reduced, the current traversing the winding 142 and the control resistor R4 in series relation is correspondingly decreased; whereby the reduction in the current traversing the winding 142 of the test relay 140 tends to bring about restoration thereof. As the temperature of the cooking vessel is further increased, the above-described actions are accentuated; whereby ultimately the resistance of the thermistor 31 is reduced sufficiently that the current traversing the series bridge circuit is adequate to produce a voltage reduction upon the feed conductor 168 so that the current traversing the winding 142 is insufficient to retain the test relay 140 in its operated position, so that it is restored.

More particularly, the armature 143 of the test relay 140 is returned from its operated position back into its restored position so that the actuator 145 and the actuator 144 are operated. Specifically, the movable switch spring 155 first engages the stationary switch spring 154, thereby to complete the previously-mentioned circuit for energizing the winding 122 of the switch relay 120 so as to effect operation thereof with the result that the armature 123 actuates the push rod 124 moving the power switch 125 into its open position with the consequent disconnection of the supply conductors 112, 113 and 114 from the respective feed conductors 162, 163 and 164; whereby the inner and outer sections 116a and 116b of the hotplate 16 are deenergized.

Also the movable switch spring 152 first disengages the stationary switch spring 153 and then re-engages the stationary switch spring 151; whereby the circuit for connecting the auxiliary control resistor R6 between the feed conductor 168 and the neutral line 103 is interrupted, and the previously-traced path for short-circuiting the control resistor R5 is recompleted. Thus at this time, the original direct circuit for energizing the winding 142 of the test relay 140 between the feed conductor 168 and the neutral line 103 is recompleted; and it may be assumed that the voltage applied to the feed conductor 168 as a consequence of the load imposed upon the load resistor R1 by the series bridge circuit is inadequate to effect reoperation of the test relay 140, although the removal of the control resistor R5 from the circuit for energizing the winding 142 facilitates such reoperation of the test relay 140. Again, it is noted that the interruption of the circuit for connecting the control resistor R6 across the feed conductor 168 and the neutral line 103, together with the interruption of the series circuit for energizing the winding 142 through the control resistor R5, along with the recompletion of the direct circuit for energizing the winding 142 between the feed conductor 168 and the neutral line 103, does not change the effective resistance of the network due to the substantially constant equivalent resistance thereof, as explained above, when the test relay 140 occupies either its operated position or its restored position; whereby the change of position of the test relay 140 does not, in any way, affect the control of the series bridge circuit, including the thermistor 31, that is governed by the temperature of the bottom wall of the cooking vessel supported by the hotplate 16.

Subsequently, the temperature of the hotplate 16 subsides effecting a reduction in the temperature of the cooking vessel and its contents so that the temperature of the thermistor 31 is reduced bringing about an increase in the resistance thereof with a consequent decrease in the current traversing the series bridge circuit; whereby the voltage applied to the feed conductor 168 rises as a consequence of the reduction in the voltage drop across the load resistor R1, so that an increased voltage is applied across the operating winding 142 of the test relay 140. As the temperature of the cooking vessel is further reduced, the above-described actions are accentuated; whereby the voltage ultimately appearing upon the feed conductor 168 is sufficient to effect reoperation of the test relay 140 from its restored position back into its operated position. Upon reoperation of the test relay 140, the compensating circuit changes are made, as previously explained; and moreover, the movable switch spring 155 disengages the stationary switch 154 so as to interrupt the circuit for energizing the winding 122 of the switch relay 120; whereby the power switch 125 is returned back into its closed position so as again to effect heating of the inner and outer sections 16a and 16b of the hotplate 16, in the manner previously described.

In view of the foregoing description, it will be understood that the test relay 140 is alternately operated and restored to effect corresponding restoration and operation of the switch relay 120 so as to effect corresponding connection and disconnection of the inner and outer heating sections 16a and 16b of the hotplate 16 in parallel relation with respect to the outside conductors 101 and 102 of the Edison source so as to maintain the previously set temperature of the cooking vessel that is supported by the hotplate 16.

In this connection, it will be understood that the composite resistance of the series bridge circuit is controlled jointly by the resistance of the thermistor 31 and by the effective resistance of the parallel connected control resistors R3 and R4; whereby the setting of the manual knob of the device 24 in its temperature range selectively controls the effective resistance of the control resistor R4; and accordingly selectively sets the temperature that is to be maintained by the circuit network. More particularly, linear movement of the manual knob of the device 24 toward the left selectively rotates the wiper W4 progressively to include the control resistor R4 in parallel with the control resistor R3, thereby to increase the effective resistance of the control resistors R3 and R4 in the series bridge circuit; whereby the thermistor 31 must be heated to a progressively higher temperature to effect a correspondingly lower resistance thereof and a consequent equivalent resistance of the series bridge circuit. Thus, setting the manual knob of the device 24 toward the left is effective to increase the effective resistance of the control resistor R4 and consequently the effective resistance of the series bridge circuit, and results in a higher temperature being maintained by the control network, as governed by the thermistor 31 under the control of the temperature of the cooking vessel supported by the hotplate 16.

In conjunction with the operation and restoration of the test relay 140, the action of the capacitor C is particularly noted. When the test relay 140 occupies its restored position, the full voltage of the feed conductor 168 is applied in parallel relation to the winding 142 and to the capacitor C; whereas, when the test relay 140 occupies its operated position, the auxiliary control resistor R5 is inserted in series relation with the winding 142 and consequently with the capacitor C. Thus, the voltage applied across the capacitor C is higher prior to operation of the test relay 140 than it is subsequent to the operation thereof; whereby the capacitor C is at least partially discharged through the winding 142 incident to operation of the test relay 140. This action insures that the test relay 140 remains in its operated position at least during this discharge time interval of the capacitor C. Conversely, when the test relay 140 is actuated from its operated position into its restored position, the capacitor C is charged to a higher voltage as a result of the removal of the auxiliary control resistor R5 from the charging circuit thereof. This action insures a load upon the load resistor R1 at least during this charging time interval of the capacitor C, so as to insure that the test relay 140 remains in its restored position during this charging time interval. Accordingly, the arrangement of the capacitor C in the circuit network, as described above, prevents rapid hunting or flutter of the test relay 140 between its operated and restored positions.

In view of the above, it will be understood that the carrying out of automatic temperature controlled cooking operations utilizing the full size of the hotplate 16 in the boil and fry ranges of the device 24 are substantially identical to that described above in conjunction with the operation thereof, when the device 24 occupies its warm range, except that as the manual knob of the device 24 is moved linearly further toward the left into the corresponding boil and fry ranges thereof progressively higher temperatures are set for the action of the control network.

Now assuming that the cook wishes to carry out an automatic temperature controlled cooking operation employing the small size of the hotplate 16, she first sets the manual knob of the device 24 into the desired temperature range, and then operates the automatic-6" pushbutton of the pushbutton switch 21 into its position, as shown in Fig. 8; whereby the outside line 101 is commonly connected to the supply conductors 111 and 112 and the outside line 102 is connected to the supply conductor 114. The connection of the outside line 101 to the supply conductor 111 effects operation of the automatic temperature controlled equipment in the manner described above; whereby the test relay 140 operates and restores, as the temperature conditions require, effecting corresponding restoration and operation of the switch relay 120 and the corresponding control of the power switch 125. When the power switch 125 occupies its closed position, the supply conductors 112 and 114 are connected via the bridging members 126 and 128 of the power switch 125 to the feed conductors 162 and 164 to effect the energization of only the inner heating section 16a of the hotplate 16. Of course, when the power switch 125 occupies its open position, the inner heating section 16a is deenergized; whereby in the present example, the temperature of the hotplate 16 is automatically controlled utilizing only the inner heating section 16a for heating purposes. The control of the temperature of the hotplate 16 in this case is set by selective operation of the manual knob of the device 24 and is governed by the temperature sensing element or thermistor 31, in the manner previously explained.

Now assuming that the cook wishes to carry out a cooking operation employing the full size of the hotplate 16 and under manual control (normally independently of the automatic temperature control equipment) and at the high heating rate, she merely operates the manual high-8" pushbutton of the pushbutton switch 21 into its position, as shown in Fig. 4; whereby the outside line 101 is commonly connected to the supply conductors 111, 112 and 113, and the outside line 102 is connected to the supply conductor 114. Also, in this example, the side switch 73 is operated into the open position, disconnecting the control resistor R4 from the conductor 172, with the result that the control resistor R3 is effectively inserted alone into the series bridge between the current limiting resistor R2 and the thermistor 31; whereby the series bridge circuit has an exceedingly high resistance that is altogether independent of the adjusted position of the manual knob of the device 24. In this case, the test relay 140 is operated to effect the restoration of the switch relay 120 with the result that the power switch 125 occupies its closed position, so that the outside line 101 is connected through to the terminals 16a' and 16b' and the outside line 102 is connected through to the terminals 16a" and 16b"; whereby the inner and outer heating sections 16a and 16b are energized in parallel relationship across the 236-volts of the three-wire Edison source.

In this case, the heating of the hotplate 16 at the high heating rate is normally continuous, since it is not likely that the thermistor 31 will become so hot as to reduce the resistance of the series bridge circuit sufficiently to effect the restoration of the test relay 140, by virtue of the inclusion of the fixed control resistor R3 (independent of the adjustable control resistor R4) therein. However, in the event of overheating of the hotplate well beyond the upper end of the fry-temperature range, the resistance of the thermistor 31 is reduced sufficiently to effect the restoration of the test relay 140, and the consequent operation of the switch relay 120, with the result that the power switch 125 is operated into its open position to deenergize the hotplate 16. Thus in the present case, the automatic temperature control equipment serves only as a safety system giving the hotplate 16 over-heat protection, when the pushbutton switch 21 occupes its manual high-8" position.

Now assuming that the cook wishes to carry out a cooking operation employing the reduced size of the hotplate 16 and under manual control (normally independently of the automatic temperature control equipment) and at the low heating rate, she merely operates the manual low-6" pushbutton of the pushbutton switch 21 into its position, as shown in Fig. 5; whereby the outside line 101 and the neutral line 103 are respectively connected to the supply conductors 112 and 114, thereby to bring about the energization of only the inner heating section 16a of the hotplate 16 across the 118-volts of the three-wire Edison source. Again the automatic temperature control equipment serves only as a safety system giving the hotplate 16 over-heat protection, since the side switch 73 occupies its open position, when the pushbutton switch 21 occupies its manual low-6" position.

Now assuming that the cook wishes to carry out a cooking operation employing the full size of the hotplate 16 and under manual control independently of the automatic temperature control equipment and at the warm heating rate, she merely operates the manual warm-8" pushbutton of the pushbutton switch 21 into its position, as shown in Fig. 6; whereby the outside line 101 and the neutral line 103 are respectively connected to the supply conductors 112 and 113, thereby to bring about the energization of the inner and outer heating sections 16a and 16b in series relation, across the 118-volts of the three-wire Edison source. Thus, the hotplate 16 is continuously heated at the warm rate entirely independently of the automatic temperature control equipment, since no power connection is completed in this case to the supply conductor 111.

Of course, it will be understood that at the conclusion of any cooking operation, when the off pushbutton of the pushbutton switch 21 is operated into its position, as shown in Fig. 3, all of the connections between the lines 101, 102 and 103 and the supply conductors 111, 112, 113 and 114 are interrupted effecting deenergization of all of the circuit elements and insuring that the test relay 140 and the switch relay 120 occupy their restored positions; and, of course, both the inner and outer heating sections 16a and 16b of the hotplate 16 are deenergized.

In the operation of the circuit network, it will be appreciated that the glow discharge tube 116 serves as a voltage regulator to maintain substantially constant the voltage applied between the control bus 161 and the neutral line 103, notwithstanding some variations in the voltage of the three-wire Edison source.

Further, it is noted that the wipers W5 and W6 are adjustable with respect to the respective auxiliary control resistors R5 and R6 in order to accommodate a factory or repairman's adjustment so as to insure that the operating range of the circuit network corresponds to and is calibrated within the range of the manual knob of the device 24.

The purpose of the current-limiting resistor R2 is to prevent self-heating of the thermistor 31 by the current passing therethrough in the series bridge circuit when the control resistor R3 is cut-out of the series bridge circuit. In other words, when the control resistor R3 is set at zero resistance corresponding to the lowermost end of the warm band of the device 24, it is undesirable that the thermistor 31 should be heated as a consequence of the normal current passing therethrough; which undesirable possibility is prevented by the fixed inclusion of the current limiting resistor R2 in the series bridge circuit.

In view of the foregoing description of the mode of operation of the circuit network, it will be understood: that the manual high-8" and manual low-6" cooking operations may be carried out normally independently of the automatic temperature control equipment, although retaining operation thereof for safety purposes to prevent over-heating of the hotplate 16, when the pushbutton switch 21 occupies its corresponding positions respectively shown in Figs. 4 and 5; that warm-8" cooking operations may be carried out upon the hotplate 16 entirely independently of the temperature control equipment, when the pushbutton switch 21 occupies its corresponding position shown in Fig. 6; that automatic-8" and automatic-6" cooking operations may be carried out upon the hotplate 16 under the direct control of the automatic temperature control equipment, when the pushbutton switch 21 occupies its corresponding positions respectively shown in Figs. 7 and 8; and that the hotplate 16 is completely deenergized, when the pushbutton switch 21 occupies its corresponding off position shown in Fig. 3.

In the two automatic temperature controlled cooking operations, the thermal controls that are derived by the thermistor 31 from the cooking vessel supported by the hotplate 16 are translated thereby into electrical controls in the series bridge circuit in order selectively to establish the voltage supplied to the feed conductor 168, and consequently to control the position of the test relay 140, and thus the position of the switch relay 120, so that the hotplate 16 is selectively connected and disconnected with respect to the three-wire Edison source for the purpose of maintaining the preset temperature. In the arrangement, the range of the thermistor 31 is selectively established by selectively setting the effective resistance of the control resistor R3; which may be accomplished by corresponding manipulation of the manual knob of the device 24. Accordingly, the hotplate 16 is energized cyclically effecting modulation of the heating thereof, and thereby maintaining the preset cooking temperature of the supported cooking vessel and its contents.

Also, it will be understood that the effective size of the hotplate 16 is also selectively established by the pushbutton switch 21: the hotplate 16 being effectively established as a full-size 8" hotplate, when the pushbutton switch 21 occupies its respective manual high-8", manual warm-8", and automatic-8" positions, as respectively shown in Figs. 4, 6 and 7; and the hotplate 16 being effectively established as a reduced-size 6" hotplate, when the pushbutton switch 21 occupies its respective manual low-8" and automatic-6" positions, as respectively shown in Figs. 6 and 8. At this point, it is mentioned that the particular sizes of 8" and 6" of the hotplate 16 are, by no means, critical and, in fact, correspond to the normal diameters of the outer heating section 16b and the inner heating section 16a respectively provided in a conventional hotplate.

Accordingly, it is apparent that there has been provided in heating apparatus of the hotplate type, an improved circuit network for selectively controlling the effective size of the hotplate and for selectively controlling heating of the hotplate either manually on a basis of fixed heating rates or automatically on a basis of temperatures of a cooking vessel and its contents supported by the hotplate; wherein all of the selective controls mentioned fundamentally are achieved by the selective operations of a single manually operable pushbutton switch.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric hotplate adapted to support a vessel to be heated, and a source of electric power: the combination comprising a unitary manually operable control switch connected to said source and having an automatic temperature control position and a heat-setting position and an off position, a set of supply conductors connected between said control switch and said hotplate, a power switch serially included in said supply conductors between said control switch and said hotplate, said power switch having a normal closed position, and automatic temperature control equipment, said control switch being operative into its automatic temperature control position to enable said equipment and to connect said source to said supply conductors so that the heating of said hotplate is established upon a temperature control basis, said control switch being operative into its heat-setting position to connect said source to said supply conductors so that the heating of said hotplate is established upon a fixed heating rate basis, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

2. In electric heating apparatus including an electric hotplate adapted to support a vessel to be heated, and a source of electric power: the combination comprising a unitary manually operable control switch connected to said source and having an automatic temperature control position and a plurality of heat-setting positions and an off position, a set of supply conductors connected between said control switch and said hotplate, a power switch serially included in said supply conductors between said control switch and said hotplate, said power switch having a normal closed position, and automatic temperature control equipment, said control switch being operative into its automatic temperature control position to enable said equipment and to connect said source to said supply conductors so that the heating of said hotplate is established upon a temperature control basis, said control switch being selectively operative into its plurality of heat-setting positions respectively to complete a corresponding plurality of different electrical connections from said source to said supply conductors and respectively corresponding to different heating rates so that the heating of said hotplate is established upon a fixed heating rate basis, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

3. In electric heating apparatus including an electric hotplate provided with a plurality of heating sections and adapted to support a vessel to be heated, and a source of electric power: the combination comprising a unitary manually operable control switch connected to said source and having a plurality of automatic temperature control positions and a heat-setting position and an off position, a set of supply conductors connected between said control switch and the different heating sections of said hotplate, a power switch serially included in said supply conductors between said control switch and said hotplate, said power switch having a normal closed position, and automatic temperature control equipment, said control switch being operative into any one of its automatic temperature control positions to enable said equipment and selectively operative into its plurality of automatic temperature control positions respectively to complete a corresponding plurality of different electrical connections from said source to said supply conductors so that the heating of said plurality of heating sections is selectively established upon a temperature control basis, said control switch being operative into its heat-setting position to connect said source to said supply conductors so that the heating of said hotplate is established upon a fixed heating rate basis, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

4. In electric heating apparatus including an electric hotplate provided with a plurality of heating sections and adapted to support a vessel to be heated, and a source of electric power: the combination comprising a unitary manually operable control switch connected to said source and having a plurality of automatic temperature control positions and a plurality of heat-setting positions and an off position, a set of supply conductors connected between said control switch and the different heating sections of said hot plate, a power switch serially included in said supply conductors between said control switch and said hotplate, said power switch having a normal closed position, and automatic temperature control equipment, said control switch being operative into any one of its automatic temperature control positions to enable said equipment and selectively operative into its plurality of automatic temperature control positions respectively to complete a corresponding plurality of different electrical connections from said source to said supply conductors so that the heating of said plurality of heating sections is selectively established upon a temperature control basis, said control switch being selectively operative into its plurality of heat-setting positions respectively to complete a corresponding plurality of different electrical connections from said source to said supply conductors and respectively corresponding to different heating rates so that the heating of said hotplate is established upon a fixed heating rate basis, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

5. In electric heating apparatus including an electric hotplate provided with an inner heating section and an outer heating section surrounding said inner heating section, said inner and outer heating sections being arranged substantially in a horizontal plane, whereby said inner heating section is adapted to support alone a small vessel to be heated and said inner and outer heating sections are adapted to support jointly a large vessel to be heated, and a source of electric power: the combination comprising a unitary manually operable control switch connected to said source and having first and second control positions and an off position, a set of supply conductors connected between said control switch and said hotplate, a power switch serially included in said supply conductors between said control switch and said hotplate, said power switch having a normal closed position, and automatic temperature control equipment; said control switch being operative into its first control position to enable said equipment and to connect said source to a first group of said supply conductors so that selective heating of both of said heating sections may be effected by said equipment, said control switch being operative into its second control position to enable said equipment and to connect said source to a second group of said supply conductors so that selective heating of only said inner heating section may be effected by said equipment, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

6. In electric heating apparatus including an electric hotplate provided with an inner heating section and an outer heating section surrounding said inner heating section, said inner and outer heating sections being arranged substantially in a horizontal plane, whereby said inner heating section is adapted to support alone a small vessel to be heated and said inner and outer heating sections are adapted to support jointly a large vessel to be heated, and a source of electric power: the combination comprising a unitary manually operable control switch connected to said source and having first and second and third and fourth control positions and an off position, a set of supply conductors connected between said control switch and said hotplate, a power switch serially included in said supply conductors, and automatic temperature control equipment, said control switch being operative into either of its first or second control positions to enable said equipment and operative into either of its third or fourth control positions to insure that said power switch is in its closed position, said control switch also being operative into either of its first or third control positions to connect said source to a first group of said supply conductors and operative into either of its second or fourth control positions to connect said source to a second group of said supply conductors, said first group of supply conductors extending to both of said heating sections, whereby both of said heating sections are heated under the control of said equipment when said control switch is in its first control position and heated continuously when said control switch is in its third control position, said second group of supply conductors extending only to said inner heating section, whereby only said inner heating section is heated under the control of said equipment when said control switch is in its second control position and heated continuously when said control switch is in its fourth control position, said control switch being operative into its off position to disconnect said source from said supply conductors and to disable said equipment; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively operating said power switch between its closed and open positions in order selectively to effect heating of said hotplate so that the temperature of a vessel supported thereby is maintained substantially at the desired control temperature set by said temperature setting device.

7. The electric heating apparatus combination set forth in claim 6, wherein said power switch normally occupies its closed position and is selectively operated into its open position under the control of said equipment when the latter is enabled.

8. In electric heating apparatus including an electric hotplate provided with an inner heating section and an outer heating section surrounding said inner heating section, said inner and outer heating sections being arranged substantially in a horizontal plane, whereby said inner heating section is adapted to support alone a small vessel to be heated and said inner and outer heating sections are adapted to support jointly a large vessel to be heated, and a source of electric power: the combination comprising a unitary manually operable control switch having first and second and third and fourth control positions and an off position, and automatic temperature control equipment, said control switch being operative into its first control position to enable said equipment and to prepare both of said heating sections to be energized, said control switch being operative into its second control position to enable said equipment and to prepare only said inner heating section to be energized, said control switch being operative into its third control position to energize both of said heating sections from said source, said control switch being operative into its fourth control position to energize only said inner heating section from said source, said control switch being operative into its off position to disable said equipment and to insure deenergization of both of said heating sections; said equipment including a temperature sensing element operatively associated with a vessel supported by said hotplate, a temperature setting device having a control temperature range, means including a manually operable member operatively associated with said control switch for selectively governing said temperature setting device to set a desired control temperature in the control temperature range thereof, and means controlled in response to enabling of said equipment and selectively governed jointly by said temperature sensing element and by said temperature setting device for selectively energizing from said source the prepared of said heating sections in order selectively to effect heating thereof so that the temperature of a vessel supported by said hotplate is maintained substantially at the desired temperature set by said temperature setting device.

9. The electric heating apparatus combination set forth in claim 8, wherein said control switch is in the form of a pushbutton switch including a number of individual pushbuttons respectively corresponding to its positions, and interlock means responsive to operation of any one of said pushbuttons out of its normal position for returning into its normal position the prior last-operated one of said pushbuttons.

10. In electric heating apparatus including an electric hotplate adapted to support a vessel to be heated and a source of electric power; the combination comprising a temperature sensing element operatively associated with a vessel supported by said hotplate, a first temperature setting device having a control temperature range, means including a manually operable member for selectively governing said first temperature setting device to set a desired control temperature in the control temperature range thereof, a second temperature setting device having a fixed unsafe temperature setting disposed above the control temperature range of said first temperature setting device, a unitary manually operable control switch having first and second control positions and an off position, and equipment responsive to operation of said control switch into its first control position for selectively governing the energization of said hotplate from said source under the joint control of said temperature sensing element and of said first temperature setting device in order selectively to effect heating of said hotplate so that the temperature of a vessel supported thereby is maintained substantially at the desired control temperature set by said first temperature setting device and responsive to operation of said control switch into its second control position for selectively governing the energization of said hotplate from said source under the joint control of said temperature sensing element and of said second temperature setting device in order to effect arresting of the continuous heating of said hotplate only in the event the temperature of a vessel supported thereby rises to the fixed unsafe temperature setting of said second temperature setting device, said control switch being operative into its off position to effect deenergization of said hotplate.

11. In electric heating apparatus including an electric hotplate adapted to support a vessel to be heated and a source of electric power; the combination comprising a temperature sensing element operatively associated with a vessel supported by said hotplate, a first temperature setting device having a control temperature range, means including a manually operable member for selectively governing said first temperature setting device to set a desired control temperature in the control temperature range thereof, a second temperature setting device having a fixed unsafe temperature setting disposed above the control temperature range of said first temperature setting device, a first control circuit governed jointly by said temperature sensing element and by said first temperature setting device, a second control circuit governed jointly by said temperature sensing element and by said second temperature setting device, a unitary manually operable control switch having first and second control positions and an off position, said control switch being operative into its first control position to enable said first control circuit and operative into its second control position to enable said second control circuit and operative into its off position to disable said first and second control circuits, and equipment controlled by said enabled first control circuit for selectively governing the energization of said hotplate from said source to maintain the temperature of a vessel supported thereby substantially at the desired control temperature set by said first temperature setting device and controlled by said enabled second control circuit for selectively governing the energization of said hotplate from said source to maintain the temperature of a vessel supported thereby below the fixed unsafe temperature setting of said second temperature setting device.

12. In electric heating apparatus including an electric hotplate provided with two heating sections and adapted to support a vessel to be heated, and a source of electric power; the combination comprising a temperature sensing element operatively associated with a vessel supported by said hotplate, a first temperature setting device having a control temperature range, means including a manually operable member for selectively governing said first temperature setting device to set a desired control temperature in the control temperature range thereof, a second temperature setting device having a fixed unsafe temperature setting disposed above the control temperature range of said first temperature setting device, a unitary manually operable control switch having first and second and third and fourth control positions and an off position, said control switch being operative into either of its first and third control positions to prepare a first circuit for energizing both of said heating sections from said source and operative into either of its second and fourth control positions to prepare a second circuit for energizing only one of said heating sections from said source, said control switch being operative into its off position to interrupt said first and second circuits, and equipment responsive to operation of said control switch into either of its first and second control positions for selectively governing the energization of said hotplate via the prepared one of said first and second circuits under the joint control of said temperature sensing element and of said first temperature setting device in order selectively to effect heating of said hotplate so that the temperature of a vessel supported thereby is maintained substantially at the desired control temperature set by said first temperature setting device and responsive to operation of said control switch into either of its third and fourth control positions for selectively governing the energization of said hotplate via the prepared one of said first and second circuits under the joint control of said temperature sensing element and of said second temperature setting device in order to effect arresting of the continuous heating of said hotplate only in the event the temperature of a vessel supported thereby rises to the fixed unsafe temperature setting of said second temperature setting device.

References Cited in the file of this patent

UNITED STATES PATENTS

| | | |
|---|---|---|
| 2,591,849 | McDowell | Apr. 8, 1952 |
| 2,613,289 | Warner | Oct. 7, 1952 |
| 2,654,824 | Schroeder | Oct. 6, 1953 |
| 2,727,975 | Molyneaux et al. | Dec. 20, 1955 |
| 2,742,557 | Macoicz | Apr. 17, 1956 |
| 2,742,558 | Simmons | Apr. 17, 1956 |
| 2,764,662 | Conkling | Sept. 25, 1956 |